United States Patent Office 2,866,901
Patented Dec. 30, 1958

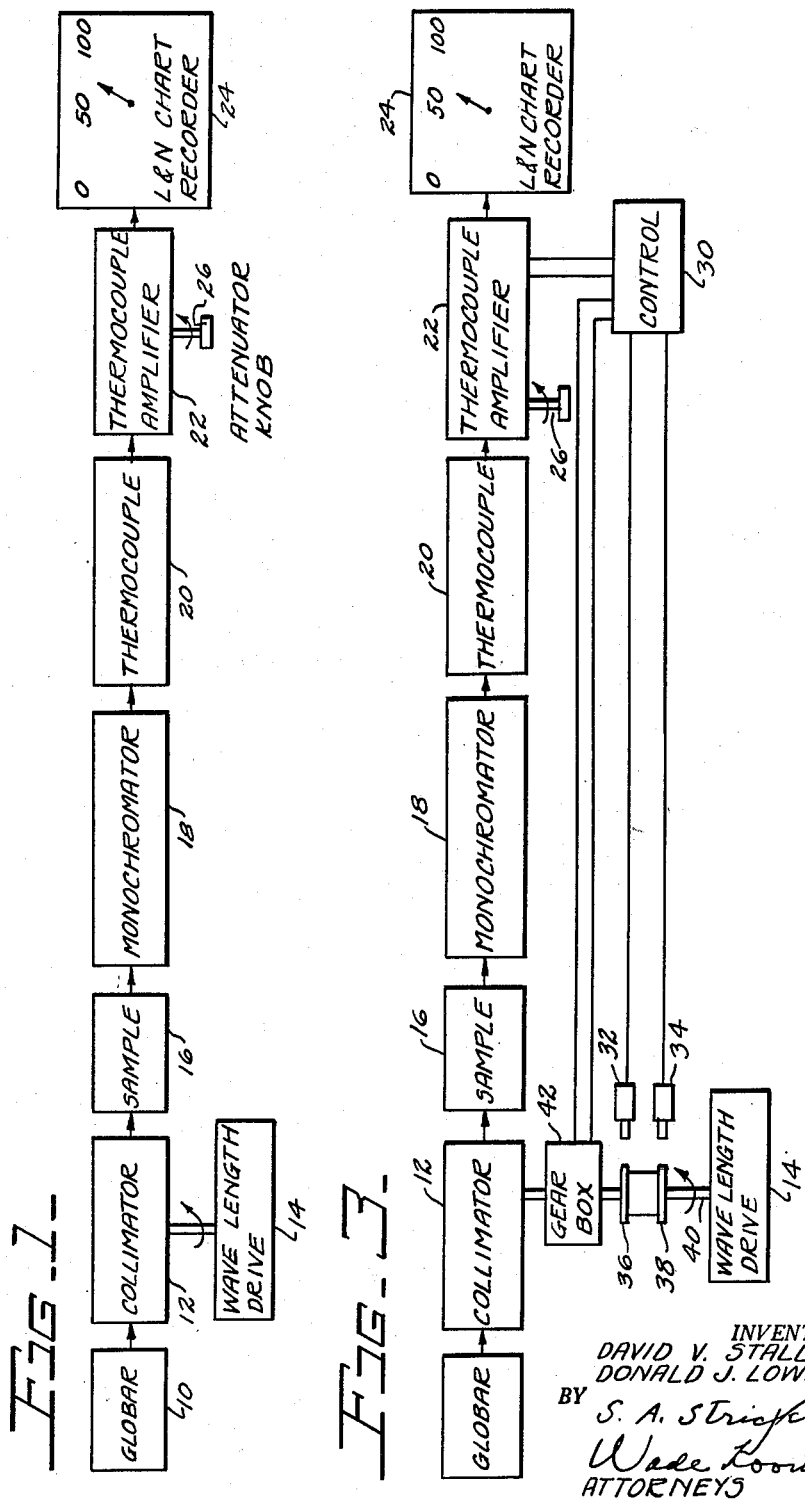

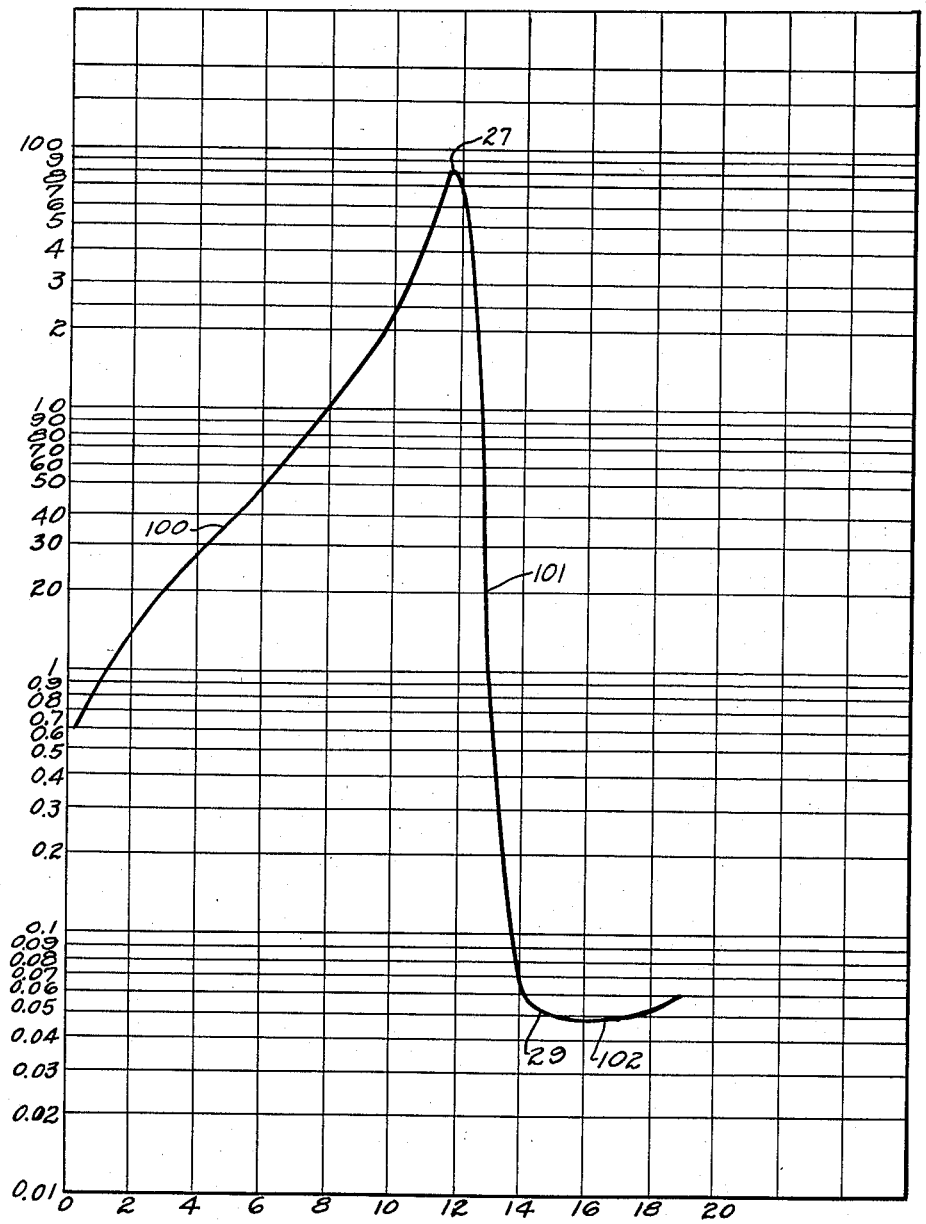

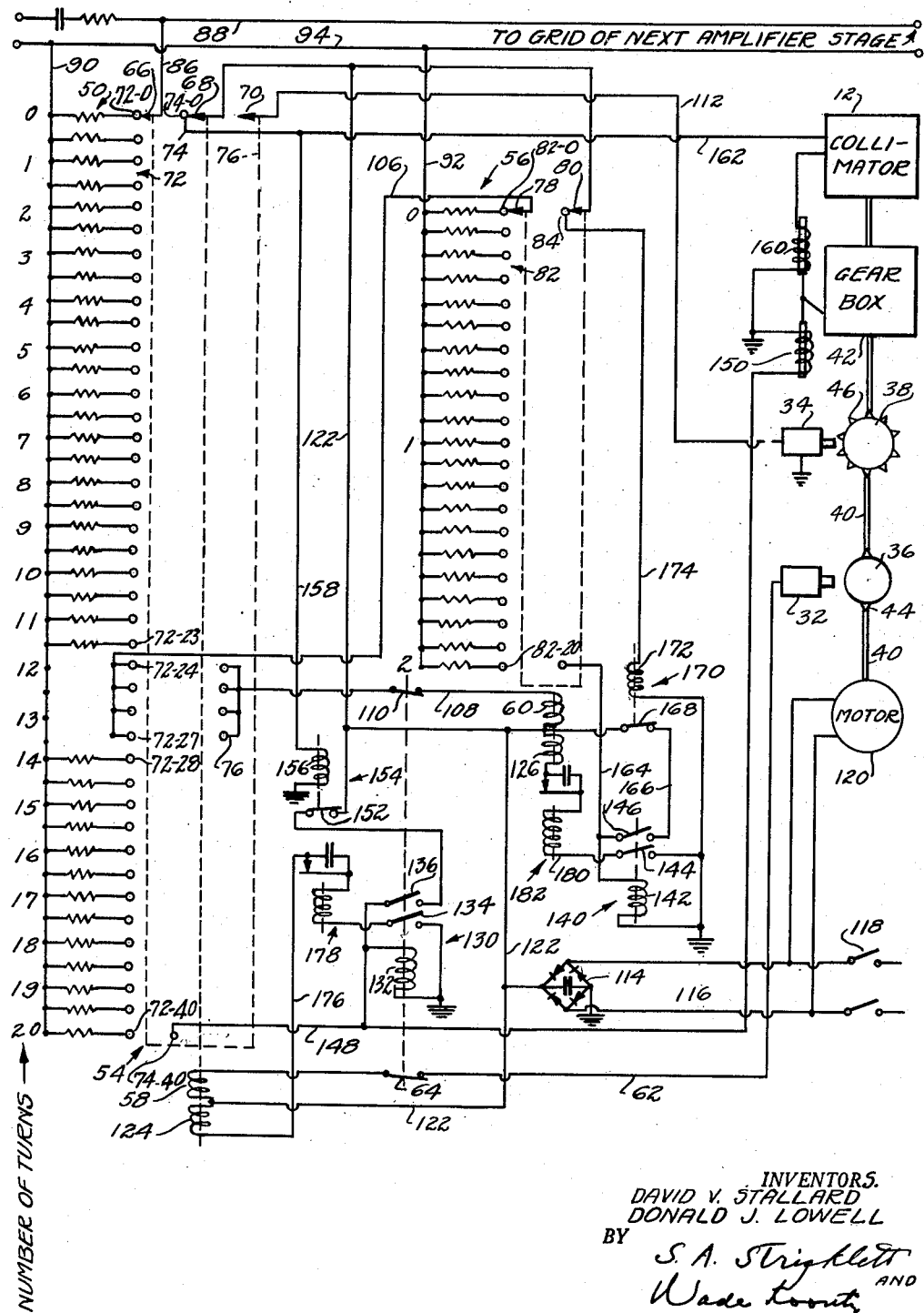

2,866,901

SPECTROMETER CONTROL

David V. Stallard, Cambridge, and Donald J. Lovell, Boston, Mass., assignors, by mesne assignments, to the United States of America as represented by the Secretary of the Air Force Application June 1, 1956, Serial No. 588,936

5 Claims. (Cl. 250—43.5)

While this invention relates to a spectrometer control and particularly to a control system automatically recording variation of the transmission characteristics of any sample with respect to a standard transmission characteristic.

In the operation of infrared spectrometers, it is customary to provide a beam from a standard infrared source and pass the beam through a sample to impinge on a radiation separating device such as a prism. The separating device is displaced to successively direct the various wave bands of the spectrum onto an energy detecting device and to record the detected energy level of the several wave bands. With standard sources and "no sample" a reproducible standard curve is provided and it is found that the energy ratio in various parts of the curve is of the order of 2000 to 1.

In the operation of such devices it is customary to provide various samples and to compare the transmission of these samples with the transmission of the "no sample" so that by comparing the difference between the "no sample" curve and the curve of any given sample, the transmittancy of the sample may be determined.

Because of the high ration difference between the height of various portions of the curve, it is desirable to eliminate transmission curves and to record only the difference between the curves so that the transmittancy curve may be recorded by a recording instrument having a relatively narrow range of movement as compared to the 2,000 to 1 ratio of the standard curve.

It has heretofore been proposed to provide automatic means responsive to the sweep of the spectrometer to automatically vary a shutter opening to compensate for the high ratio between different portions of the standard curve.

The present invention proposes a relatively simple control system in which a variable gain amplifier is interposed between a detector and the recording system. Gain control of the amplifier is accomplished by providing attenuator elements for controlling the instantaneous gain with the attenuator elements correcting the high ratio "no sample" curve to a base curve so that the recorded curve is the result of the difference between the sample and "no sample" curves.

According to the invention, an infrared spectrometer consisting of a standard infrared source such as a "Globar" heater supplies a ray of infrared energy through a sample chamber to an ocular system including a prism which will provide a spectrum of the particular band width, such as the infrared band, which is to be investigated by the invention. A wavelength selector is operative to sequentially focus the various wavelengths of the spectrum on a detecting device such as a thermocouple detector. The output of the thermocouple detector is applied through an amplifier device to a standard recording device. A plurality of attenuator elements is provided for controlling the gain of the amplifier and these attenuator elements are automatically connected over the period of the spectrum so as to automatically control the gain of the attenuator in accordance with the amplitude of a standard infrared transmission record. Because of the relative steepness of the various portions of the transmission record, it is desirable to substitute the attenuator elements at a greater rate of frequency on the steep portions of the curve than is necessary over the gradual sloping portions of the standard transmission curve.

It is accordingly an object of the invention to provide an improved recording spectrometer.

It is a further object of the invention to provide a continually operating spectrometer for sequentially de-determining the transmittancy of a series of samples.

It is a further object of the invention to provide a spectrometer automatically providing a direct transmittancy record.

It is a further object of the invention to provide a spectrometer having the output automatically compared to a standard output.

Other objects and many of the attendant advantages of the present invention will be apparent from the following detailed description taken in connection with the accompanying drawing in which:

Fig. 1 is a block diagram of a standard infrared recording spectrometer;

Fig. 2 is a characteristic standard curve of the transmission characteristic of a standard "no sample" reading;

Fig. 3 is a similar block diagram of an infrared spectrometer having a control system for providing directly a transmittancy record of the difference between a standard "no sample" and any given sample; and Fig. 4 is a schematic control system according to the invention.

In Fig. 1 is disclosed a substantially standard infrared spectrometer such as produced by the Perkin-Elmer Co. and heretofore substantially utilized for determining the infrared transmittancy of various samplings. A particular use has been to determine the infrared transmittancy of a sequence of atmospheric samples to provide a characteristic by which weather may be forecast.

This known spectrometer comprises a source 10 of standard infrared radiation which is usually a "Globar" heater. The radiation from the "Globar" heater is directed through an ocular system called a collimator 12 which limits the device to radiate energy from a spectrum covering the desired band width. The collimator 12 is driven by a wavelength selecting device 14 which may be a gear motor or other device operative at a substantially constant speed to segregate and focus successive wavelengths of the spectrum through a sample holder 16 and a monochromator 18 to a suitable energy detecting device 20, usually in the form of a thermocouple. The energy output of the detector 20 is fed through an amplifier 22 to a recording device 24. The amplifier 22 is provided with an attenuator control knob 26 for manual adjustment of an attenuator element.

The output of a standard "no sample" will be as shown in Figure 2 and have a relatively wide differentiation between the peaks 27 and 29 with a relatively gentle slope over the first and final portions 100 and 102 of the curve but with an extremely steep slope over an intermediate portion 101 of the curve, with the steep portion extending from the maximum to the minimum parts 27 to 29 of the curve.

In the heretofore known constructions a variable aperture has been provided to modify the amount of light transmitted to substantially reduce the amplitude of the extreme portions 27–29 of the curve and preferably to provide a relatively smooth curve of low amplitude or even a straight line curve for a standard curve while the transmittancy of any sample will then be shown as a variation from the standard curve.

In the exemplary embodiment accordnig to Fig. 3, a spectrometer has been provided with a control device 30 having microswitch elements 32 and 34 actuated by switch cams 36 and 38 mounted on the shaft 40 of the wavelength drive 14. A reversing system such as a gear box 42 is provided between the wavelength drive 14 and the collimator 12. Th switch actuating cam 36 is provided with two control cam surfaces 44 over the circumference thereof so that the microswitch 32 will be operated twice each revolution of the shaft 40. The switch actuating cam 38 is provided with a relatively large number of cam elements 46, for example, 10 so that the switch 34 will be actuated 10 times in a complete revolution of the shaft 40. The control device 30 includes a plurality of attenuator elements 50 adapted to be connected between the stages of the amplifier 22 to control the gain therein.

A first selector switch 54 and a second selector switch 56 are operative to sequentially connect the several attenuator elements 50 in controlling relation to the amplifier 22. In the illustrated embodiment the switches 54 and 56 are step operated by means of a first stepping coil 58 and a second stepping coil 60. The coil 58 is connected to microswitch 32 by way of conductor 62 including back contact blade 64. The switch 54 is provided with a plurality of movable contacts 66, 68 and 70 which engage contact banks 72, 74 and 76. The switch 56 is provided with two movable contacts 78 and 80 which engage contact banks 82 and 84.

Movable contact 66 is connected by conductor 86 to the interstage grid conductor 88 of the amplifier 22 and the attenuator elements 50 are connected by conductors 90 and 92 to the base conductor 94 of the amplifiers 22. The attenuator elements 50 operative over the portion 100 of the characteristic curve of Fig. 2 are successively connected to the contacts 72-0 to 72-23 of the bank 72, the elements operative over the portion 101 are successively connected to the contacts 82-0 to 82-20 of bank 82 and the elements 50 operative over the portion 102 are connected to contacts 72-28 to 72-40 of contact bank 72. This connection essentially provides two groups of attenuator elements 50, the first group being operative over the relatively gentle slopes of the characteristic curve and directly controlled by stepping switch 54 and the second group operative over the steep portion 101 of the curve and directly controlled by stepping switch 56. The movable contact 78 of stepping switch 56 is connected to contacts 72-24 to 72-27 of stepping switch 54 by conductor 106 so that the attenuator elements 50 connected to contact bank 82 are only operative while movable contact 66 is in engagement with contacts 72-24 to 72-27.

The stepping coil 60 of switch 56 is connected to contacts 76-24 to 76-27 of stepping switch 54 by conductor 108 including disconnect blade 110. Microswitch 34 actuated by cam 38 is connected by conductor 112 to movable contact 70 of stepping switch 54 so that microswitch 34 is connected to stepping coil 60 only while contact 70 is in engagement with contacts 76-24 to 76-27.

Operating power is furnished from any suitable source such as the rectifier 114 supplied by supply line 116 including a control switch 118. The motor 120 of the wavelength drive 14 is also supplied from line 116. The rectifier 114 is connected to power buss 122 having connections to the stepping coils 58 and 60, and to reverse stepping coils 124 and 176 as well as moving contacts 68 and 80 as will presently appear.

A control relay 130 for stepping switch 54 has an actuating coil 132 positioning front contact blade 134, lock-in blade 136 and back contact blade 110. Control relay 140 for stepping switch 56 has an actuating coil 142 positioning front contact blade 144 in lock-in blade 146. Closing coil 132 is connected to contact 74-40 of stepping switch 54. Conductor 148 is likewise connected to reversing coil 150 of the gear box 42, so that when moving contact 68 engages contact 74-40 an actuating impulse will be applied to actuating coil 132 and to reversing coil 150. A lock-in circuit 150 including lock-in blade 136 maintains coils 132 and 150 energized after actuation of the relay 130. A back contact blade 152 of a limit relay 154 is included in circuit 150. Actuating coil 156 of relay 150 is connected by conductor 158 to contact 74-0 of switch 54. Contact 74-0 is also connected to the forward operating coil 160 of gear box 42 by conductor 162 including a limit switch (not shown) in collimator 12. Likewise coil 142 is connected by conductor 164 to contact 84-20 of switch 56. A lock-in circuit 166 includes lock-in blade 146 and back contact 168 of limit relay 170 having coil 172 connected to contact 84-0 by conductor 174.

Front contact 134 connects in trip circuit 176 of the reverse stepping coil 124 of switch 54. An interrupter 178 is included in conductor 176 to produce multiple actuation of switch 54. Likewise reverse stepping coil 126 of switch 56 is energized over circuit 180 including front blade 144 and interrupter 182.

In the application of the spectrometer, according to the invention, assuming that the stepping switches are in the position shown in Fig. 3, switch 18 is closed, applying energy to the motor 120 and to the rectifying device 114. The application of power to the rectifier 114 energizes the buss 122 and through the contact 68 to contact 74-0 and over conductor 158 to coil 156 of the relay 154, opening the back contact 152 and assuring de-energization of relay 130. Likewise, energy from contact 74-0 will flow over conductor 162 to coil 160 insuring that the gear box is in position for forward operation.

In the event that the collimater should not be in proper position, the gear box would remain in reverse position until the collimator had arrived at zero position at which time the limit switch therein would insure the energization of coil 160 and the proper position of gear box 142. Similarly with positioning of the device, energy will flow over contact 80 through contact 84-0 and conductor 174 to energize coil 172 and open the back contact 168 to insure de-energization of relay 140.

With the rotation of the motor 120, the cam 36 would rotate with the shaft 40, causing the cam member 44 to actuate the microswitch 32, which will supply an impulse to the forward stepping coil 58 of stepping switch 54, causing the movable contacts 66, 68 and 70 to move forward one step so that energy is removed from the conductors 158 and 162. The cam 36 will continue to supply impulses to the stepping coil 58. When the movable switch makes engagement at the 12th revolution of the shaft 40 with the contacts 72-24, movable contact 78 of stepping switch 56 is connected to the intermediate grid connection 88. Simultaneously, the movable contact 70 is engaged with contact 76-24 so that the cam 38 will cause actuation of the microswitch 34 to energize the step coil 60 of stepping switch 56 at a higher rate of speed so that the movable contacts 78 and 80 will move forward as shown at the rate of 10 steps for each revolution of the shaft 40. When the moving contact 66 moves to contacts 72-28, the actuating elements 50 connected to stepping switch 54 will again be inserted and moving contact 80 will have engaged 84-20 of stepping switch 56. Engagement of contact 80 with 84-20 will supply an impulse to relay coil 142, closing the front contact 144 and to lock in contact 146 so that the relay is in locked-in position. Energy will then flow through the reverse stepping coil 176 and the interrupter 182 which will cause the stepping switch 56 to step in a reverse direction will contact 80 engages contact 84-0 at which time coil 72 of relay 170 will be energized over conductor 174 opening back contact 168 and deenergizing relay 140 leaving stepping switch 56 in its initial condition. The continuing stepping of stepping switch 54 will cause contact 68 to engage contact 74-40, at which time an impulse will be supplied over a conductor 148 to actuate coil 132 of relay 130, causing the closing of front contact 134 and lock-in blade 136 simultaneously. The back contact blade 110 will be opened in circuit 108 so that reverse stepping of the stepping switch 54 will not cause actuation of stepping coil 60 of the stepping switch 56. Simultaneously, the back contact 64 in conductor 62 will be opened preventing energization of the forward stepping coil 58 of stepping switch 54 during the inverse stepping interval. The closing of front contact 134 will energize the interrupter 178 and the reverse stepping coil 124 so that the contacts of the stepping switch 54 will be returned to its zero position, at which time contact 68 will energize contact 74-0 and energize coil 156 over conductor 158 to open the back contact 152 of relay 154, de-energizing the relay 130 and closing its back contacts 64 and 110 to place the stepping switch in condition for further operation. During this interval, the reverse coil 150 has been energized and will be maintained energized by locked-in switch 136 so that gear box 42 is in reverse drive to produce zero position of collimator 12. Assuming that the collimator 12 and the switch 68 have arrived at zero position, the forward or normal operating coil 160 will be energized to switch the gear box to normal operation and the device will again be in position for a second or a continuing sampling.

It will thus be seen that the present invention provides a system by which a series of samplings may be continuously run and automatically compared to a standard sample so that the transmittancies of the samples being run may be continuously noted and recorded. The invention thus provides an automatic sampling system for use in such applications as weather forecasting and in any condition in which the transmittancy of samples should be continuously determined.

For purposes of exemplification, a particular embodiment of the invention has been shown and described according to the best present understanding thereof. However, it will be apparent to those skilled in the art that many changes and modifications in the construction and arrangement of the parts thereof may be readily resorted to without departing from the true spirit and scope of the invention.

We claim:

1. For use with a recording infrared spectrometer of the type having a spectrum producing device, a driving device operatively connected to said spectrum producing device, a detector, a recorder and an amplifier connected between the detector and the recorder, a record controller comprising a plurality of attenuating elements for connection to the amplifier to control the gain thereof, said attenuating elements being arranged in two groups, a first and a second selector device, switching means operatively connected to said driving device for actuating said selector devices, said switching means actuating said second selector device at a higher rate of speed than said first selector device, said first selector device being operative to sequentially connect preselected attenuating elements of said first group to the amplifier over a preselected portion of the spectrum and to connect said second selector device in operative condition over a second preselected portion of the spectrum, said second selector device being operative to sequentially connect predetermined ones of said attenuator elements of said second group in operative relation to said amplifier over said second preselected portion of the spectrum.

2. For use with spectrometer of the type having a spectrum producing device, a detector, a recorder, an amplifier connected between said recorder and said detector, a drive device and a drive shaft operatively connecting said drive device to sequentially focus selected portions of the spectrum on said detector, a control system comprising a plurality of attenuator elements for connection to said amplifier to control the gain thereof, said attenuator elements being arranged in two groups, a first and a second selector device, a first and a second control switch for said selector devices, a first and a second switch actuating device operatively connected to said shaft, said second actuating device actuating said second switch at a higher rate than said first actuating device actuates said first switch, said first selector device sequentially connecting preselected attenuating elements of said first group in gain controlling relation with said amplifier over a preselected portion of the spectrum and connecting said second selector in operative condition over a second preselected portion of the spectrum to sequentially connect the attenuating element of said second group in gain controlling relation with said amplifier over said second portion of the spectrum.

3. For use with a spectrometer having a spectrum producing device, a detector, an amplifier and a driving device operatively connected to the spectrum producing device for traversing the spectrum over the detector, a control system comprising a plurality of attenuating elements for connection to the amplifier to determine the gain thereof, said attenuating elements being connected in two groups, a first step selector switch, a first stepping coil for step by step advance of said first step selector switch, first switch means actuated by said driving device for periodically energizing said first stepping coil, a second step selector switch, a second stepping coil for advancing said second step selector switch, second switch means actuated by said driving device, said first stepping switch being operative over a predetermined portion of the spectrum to successively connect predetermined ones of said first group of attenuating elements in controlling relation to the amplifier and to energize the stepping coil of said second step selector switch over a second portion of the spectrum whereby said second step selector switch is operative in response to said second switch means to successively connect preselected ones of said second group of attenuating elements in controlling relation to said amplifier over said second portion of the spectrum, said second switch means being operated at a rate different than the operating rate of said first switch means.

4. For use with a spectrometer having a spectrum producing device, a detector, an amplifier and a driving device operatively connected to the spectrum producing device for traversing the spectrum over the detector, a control system comprising a plurality of attenuating elements for connection to the amplifier to determine the gain thereof, said attenuating elements being connected in two groups, a first step selector switch, a first stepping coil for step by step advance of said first step selector switch, first switch means actuated by said driving device for periodically energizing said first stepping coil, a second step selector switch, a second stepping coil for advancing said second step selector switch, second switch means actuated by said driving device, said first stepping switch being operative over a predetermined portion of the spectrum to successively connect predetermining ones of said first group of attenuating elements in controlling relation to the amplifier and to energize the stepping coil of said second step selector switch over a second portion of the spectrum whereby said second step selector switch is operative in response to said second switch means to successively connect preselected ones of said second group of attenuating elements in controlling relation to said amplifier over said second portion of the spectrum, said second switch means being operated at a rate different than the operating rate of said first switch means, means responsive to predetermined operation of said first step selector switch to return said step selector switch to zero position.

5. For use with a spectrometer having a spectrum producing device, a detector, an amplifier, and drive means for sequentially directing portions of a spectrum on the detector, an automatic system for varying the gain of the amplifier comprising a plurality of attenuator elements for connection in controlling relation to the amplifier, a first and second selector switches, said first selector switch being operative to periodically connect selected attenuator elements in predetermined sequence over a portion of the spectrum and to substitute said second selector device over a preselected portion of the spectrum, said second selector device being operative to connect attenuator elements in predetermined sequence over said preselected portion of the spectrum, said second selector device operating at a rate different from the operating rate of said first selector device.

References Cited in the file of this patent

UNITED STATES PATENTS

| | | |
|---|---|---|
| 2,577,735 | Broomell | Dec. 11, 1951 |
| 2,656,468 | Schlesman | Oct. 20, 1953 |
| 2,792,501 | Barton | May 14, 1957 |
| 2,806,957 | McDonald | Sept. 17, 1957 |
| 2,822,475 | Miller | Feb. 4, 1958 |
| 2,824,972 | Beitz | Feb. 25, 1958 |